United States Patent [19]

Pellicori et al.

[11] Patent Number: 4,957,371
[45] Date of Patent: Sep. 18, 1990

[54] WEDGE-FILTER SPECTROMETER

[75] Inventors: Samuel F. Pellicori; Aram M. Mika, both of Santa Barbara, Calif.

[73] Assignee: Santa Barbara Research Center, Goleta, Calif.

[21] Appl. No.: 132,227

[22] Filed: Dec. 11, 1987

[51] Int. Cl.$^5$ .............................. G01J 3/12; G01J 3/50
[52] U.S. Cl. ................................... 356/419; 250/226; 350/166
[58] Field of Search ................. 356/416, 419; 350/166; 250/226

[56] References Cited

U.S. PATENT DOCUMENTS

| | | | |
|---|---|---|---|
| 2,708,389 | 5/1955 | Kavanagh . | |
| 3,442,572 | 5/1969 | Illsley et al. | 350/166 |
| 3,885,879 | 5/1975 | Louder et al. | 250/227 |
| 3,929,398 | 12/1975 | Bates | 250/226 |
| 4,054,389 | 10/1977 | Owen | 356/419 |
| 4,187,475 | 2/1980 | Wieder | 372/99 |
| 4,346,992 | 8/1982 | Schwartz | 356/73 |

FOREIGN PATENT DOCUMENTS

| | | |
|---|---|---|
| 136075 | 6/1979 | German Democratic Rep. ............... 356/419 |
| 57-179807 | 11/1982 | Japan . |
| 60-252304 | 12/1985 | Japan . |
| 60-262102 | 12/1985 | Japan . |
| 1208525 | 4/1984 | U.S.S.R. . |

Primary Examiner—F. L. Evans
Attorney, Agent, or Firm—W. C. Schubert; W. K. Denson-Low

[57] ABSTRACT

A wedge-filter spectrometer 1 comprises means 10 for spectrally dispersing an incident radiation beam comprising a first plurality of layers of high (H) index of refraction material and a second plurality of layers of low (L) index of refraction material, individual ones of the H and the L layers overlying one another in accordance with a given sequence, each of the H and the L layers having a substantially linearly tapered thickness of substantially constant slope, and means for detecting 17 at a plurality of points a spectrally dispersed radiation beam, the radiation beam being spectrally dispersed by the H and the L layers.

21 Claims, 3 Drawing Sheets

WEDGE-FILTER SPECTROMETER

FIELD OF THE INVENTION

The present invention relates to spectrometers and, in particular, relates to a wedge-filter spectrometer having a compact wedge-shaped spectral disperser optically coupled to an electro-optical detector and also relates to apparatus and methods of fabricating a wedge-shaped spectral disperser.

BACKGROUND OF THE INVENTION

Spectrometers having either a prism or a grating as a spectral dispersing element are known. Both prism and grating spectrometers require that relay optics be provided within the system. The inclusion of such relay optics has an adverse effect on the size and on the mass and stability of the system. In general, the spectral stability and accuracy of such systems are compromised by the mechanical sensitivity of the prism or grating and associated relay optics. Such an adverse effect on system size, mass and stability is particularly disadvantageous for portable spectrometers, such as spectrometers intended for mobile and spaceborne applications. In such portable applications the vibration and motion of a platform, in conjunction with the large size and mass of the spectrometer, may render the spectrometer unusable for its intended purpose.

Another type of spectrometer is an interferometer. The use of conventional interferometers is also attended by several problems. In general, these problems with known interferometers are characterized as including precision moving parts, non-simultaneous wavelength acquisition and severe signal processing constraints.

In U.S. Pat. No. 3,442,572 Illsley et al. disclose a wedged filter which is deposited in a circular path around a substrate having a diameter of 6.4 centimeters by the use of two rotating sector masks or by a rotating substrate and a rotating mask in conjunction with a stationary sector mask. The rotating elements have a 2:1 angular velocity ratio. This wedged filter is relatively large, its circular shape may be unsuitable for many applications and the required tooling to fabricate the filter is complex.

It is thus one object of the invention to provide for a wedge filter having a simplification of manufacturing tooling.

It is a further object of the invention to provide a wedge filter having a linear wedge.

It is a further object of the invention to provide a linear wedge filter of small size and mass.

It is still one further object of the invention to provide a wedge filter which may be advantageously integrated with an orthogonally patterned detector array.

SUMMARY OF THE INVENTION

The foregoing problems are overcome and the objects are realized by a wedge-filter spectrometer constructed in accordance with a method and apparatus of the invention wherein a wedge-filter spectrometer comprises means for spectrally dispersing an incident radiation beam comprising a first plurality of layers of high (H) index of refraction material and a second plurality of layers of low (L) index of refraction material, individual ones of the H and the L layers overlying one another in accordance with a given sequence, each of the H and the L layers having a substantially linearly tapered thickness of substantially constant slope, and means for detecting, at a plurality of points, a spectrally dispersed radiation beam, the radiation beam spectrally dispersed by the H and the L layers.

There is also disclosed a method of depositing a layer of material upon a front surface of a substrate such that the layer has a predetermined linearly tapered thickness along a given axis of the substrate and a substantially constant slope. The method comprises the steps of providing a substantially transparent substrate upon a substrate mount, translating the substrate mount in an oscillatory linear manner along an axis coincident with the given axis, directing a flow of material to the front surface of the substrate in a direction normal to the given axis, the flow depositing a layer of the material upon the front surface. The method further comprises a step of positioning an aperture within the flow such that the aperture selectively blocks the flow from reaching the front surface of the substrate as the substrate is translated past an edge of the aperture, the substrate thereby being translated into and out of the flow such that a linearly tapered thickness of material is deposited on the front surface. The method further comprises the steps of passing a first and a second beam of radiation through a back surface of the substrate at a first and a second predetermined point, respectively, relative to a reference point; detecting the magnitude of the intensity of the first and second beams of radiation after they have passed through the substrate and through the layer and comparing the detected intensity of each of the beams to a reference intensity to determine a difference therebetween, the difference of the intensity of each of the beams from the reference intensity being indicative of the thickness of the layer at the first and the second predetermined points.

BRIEF DESCRIPTION OF THE DRAWINGS

The foregoing aspects of the method and apparatus of the invention will be made more apparent in the detailed description of the invention taken in conjunction with the accompanying drawings wherein.

DETAILED DESCRIPTION OF THE INVENTION

Figure 1:
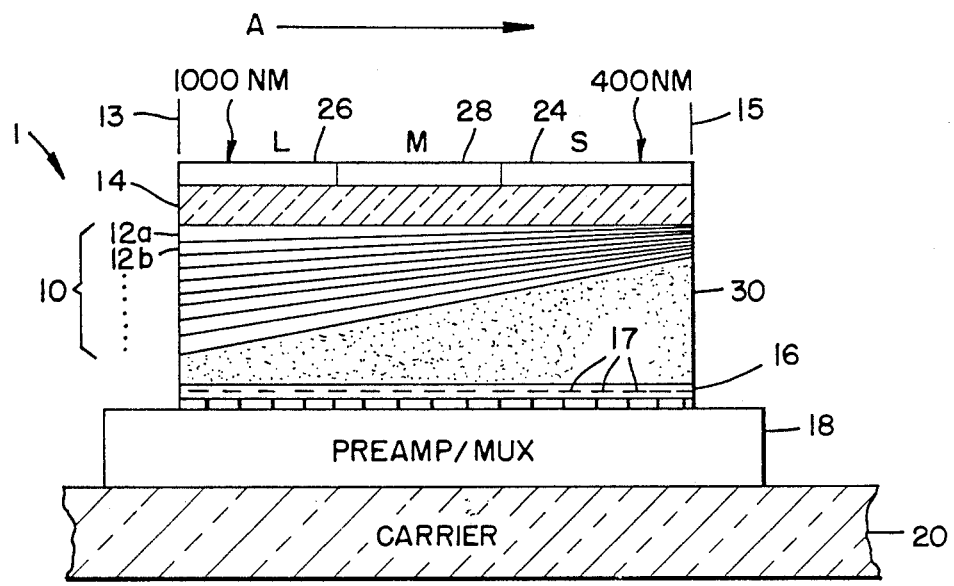
FIG. 1 is a side view of a linear wedge-filter spectral disperser integrally joined to a two dimensional photodiode detector array.

Referring now to FIG. 1 there is shown a side view of an illustrative embodiment of a wedge-filter spectrometer 1 constructed in accordance with the method and apparatus of the invention. Spectrometer 1 is comprised of a continuous spectral disperser 10 which is constructed of alternating high refractive index and low refractive index dielectric layers (12a, 12b, etc.) whose thicknesses are tapered in a controlled manner from a first edge 13 of a substantially transparent substrate 14 to an opposing second edge 15 of the substrate 14. The layers 12 are deposited upon the substrate 14 in a manner which will be described below. Substrate 14 is fabricated from material selected to be essentially transparent to radiation in the spectral regime of interest, e.g., it may be comprised of optical glass for transmitting visible radiation or of silicon for near-infrared radiation (IR). An impinging radiation cone is typically oriented at some angle of between, for example, 10° to 20° from a surface normal of substrate 14.

The layers 12 are comprised of high (H) refractive index and low (L) refractive index dielectric layers deposited one upon another in accordance with the sequence

H LL HLHLHL HH LHLHLH LL HL and which are graded in thickness such that each of the layers has a constant slope. The layers 12 constitute an interference filter which isolates a transmission passband of wavelength equal to 4nt, where n is the value of either the high refractive index or the low refractive index material and t is the physical thickness of a layer of corresponding index of refraction material at a particular point along the spectral disperser 10 from a reference position, such as the first edge 13. The spectral disperser 10 constructed as described above may be integrated with a two dimensional array 16 of detector elements 17 to produce a unitary spectrometer device of small physical size and mass operable for discriminating passband wavelengths according to specific detector element 17 locations within the array 16. The detector elements may be arranged in an orthogonal two dimensional array of detector elements characterized in a well known manner by rows and columns of detector elements. At any particular position along the tapered direction, indicated by the arrow A, a wavelength passband profile is resolved the bandwidth of which is proportional to the detector element 17 size and to the center wavelength of the passband. Such an integrated construction overcomes many of the problems of conventional spectrometers in that it eliminates a requirement for relay optics and thus achieves a minimum size and a mechanical ruggedness which may be utilized with either parallel or focussed radiation and which also beneficially provides continuous spectral coverage over a wide range of wavelengths. For example, the spectrometer 1 may be substantially cubic in shape having edges of approximately 1 cm in length.

Also shown in FIG. 1 is an integrated circuit preamplifier/multiplexer 18 which may also be integrated with the spectrometer, the preamplifier and multiplexer 18 being coupled to individual ones of the detector elements 17 in a well known manner for selectively amplifying output signals of the detector elements 17. The preamplifier/multiplexer 18 may be further mounted on a suitable carrier 20 which provides mechanical support and electrical isolation for the spectrometer 1.

In the sequence of dielectric layers 12 H represents a layer comprised of a high refractive index material having an optical thickness substantially equal to one fourth of a reference wavelength $\lambda_0$. L represents a layer 12 comprised of a low index of refraction material also having a thickness substantially equal to one fourth of the reference wavelength $\lambda_0$. The reference wavelength, $\lambda_0$, may be derived from the equation $$\lambda_0 = 4n_H t_H = 4n_L t_L, \quad (1)$$

wherein the subscripts refer to the H or L index of refraction material. As can be realized from equation 1, if the thickness of a layer is varied a passband center wavelength, $\lambda_c$, will also vary. Thus, by tapering the layer thicknesses along the length of the substrate 14 the wavelength of interference will be different for all positions along the length. Also, by depositing the layers such that the thickness of the layers has a constant slope, the wavelength of the passband will also vary continuously.

As an example, the sequence of layers given above constitutes a multiple-order interference filter which isolates a wavelength passband having a width equal to approximately two percent of $\lambda_c$ at the half transmittance points of the filter. The ratio of the refractive indices H/L and the order of the filter substantially determine the value of the half bandwidth. The order of the filter is given, in general, by the number of adjacent quarter-wave layers disposed within a resonant cavity structure. Thus, a sequence of layers 12 given by

HL HL HL [HH] LH LH LH defines a resonant cavity having a passband centered upon a wavelength of $\lambda_c = \lambda_0$, the passband having a width determined by the number of wavelengths which will evenly fit within a spacer layer denoted by the layers within the square brackets [ ]. As the thickness of the spacer layer is increased, the bandwidth decreases in an inverse ratio. Furthermore, as more such resonant cavities are overlaid one upon another in a series fashion, the edges of the passbands become steeper and the energy at wavelengths removed from $\lambda_c$ is rejected by reflection to an increasing degree. Thus, the out-of-band transmission is attenuated to the level where the passband transmission is a virtually pure transmission. The wavelength region over which such rejection occurs is given by a relationship between the values of high and low refractive indices and is expressed as a fraction of wavelengths. This relationship is given by the equation $$\Delta\lambda_0/\Delta\lambda_c = 4/\pi \sin^{-1}(n_H - n_L/n_H + n_L). \quad (2)$$

Higher order passbands are found to occur at even multiples of the spacer layer thickness. These higher order passbands are separated by rejection regions located at odd multiples of $\lambda_0$.

It has been observed that there may be an undesired energy component appearing at wavelengths removed from the $\lambda_c$ of interest. It has also been observed that this undesired energy may be prevented from reaching the detector 16 by the addition of interference filter blocking stacks 22.

As an example, to provide a spectrometer 1 for operation over the visible/near IR region, that is the region characterized by wavelengths from 400 to 1000 nm, three blocking filter stacks may be deposited on the opposite face of the transparent substrate 14 from the tapered layers 12. In region S, a filter stack 24 is provided, the stack 24 rejecting substantially all energy of wavelengths greater than 532 nm while transmitting efficiently wavelengths below 520 nm. In region L, a filter stack 26 is provided which transmits efficiently substantially all wavelengths above 770 nm while substantially reflecting all wavelengths below 760 nm. Stacks 24 and 26 may be comprised of constant thickness quarter wave layers. In the middle region, region M, a wide bandpass stack 28 having, in accordance with the invention, tapered layers is deposited to provide wide range blocking for the passbands originating from the middle region of the filter 12.

The stacks 24–28 may be characterized as follows:

stack 24, transmissive to wavelengths <520 nm, has layers [LH]$^6$ 1.6 [LH]$^6$, where L and H are quarter waves at $\lambda=250$ nm;

stack 28, transmissive to wavelengths of 530 nm $<\lambda$ $<760$ nm, has layers [LH]$^7$ 2 [LH]$^7$, where L and H are quarter waves at $\lambda=420$ nm; and stack 26, transmissive to wavelengths of $\lambda>770$ nm, has layers [LH]$^6$ 1.3 [LH]$^6$, where L and H are quarter waves at $\lambda=520$ nm.

The spectral disperser 10 as described above may be, after fabrication, coupled to an underlying integrated detector, which includes the two dimensional photodiode array 16 and the preamp/multiplexer 18, such as by bonding the spectral disperser 10 with an epoxy or optical cement 30. As can be seen, the cement 30 is applied such that it has a corresponding wedged shape such that the substrate 14 is aligned in a substantially parallel manner with the array 16 of detectors 17. Such a structure as shown in FIG. 1 achieves, with minimal spacing between detectors 17, a significant reduction in detector-to-detector crosstalk, this reduction in optical crosstalk being advantageous in a focal plane type of application.

Although the above described embodiment of the invention discloses the use of a solid-state, two dimensional detector array, the spectral disperser 12 which forms a part of the invention may be utilized with a variety of different types of detectors, including vidicons, photomultipliers having microchannel plates, CCD imagers, and other such photodetecting devices. Also, the use of the wedged spectral disperser of the invention is applicable over a broad range of the electromagnetic spectrum from at least the ultra violet through the longwave infrared. It should also be realized that in some applications it may be desirable to eliminate the transparent substrate 14 and deposit the tapered layers directly onto, for example, the detector array or upon a vidicon faceplate. This achieves a still further reduction in system mass inasmuch as the detector array or vidicon faceplate functions in an analogous manner to the substrate 14.

Figure 2:
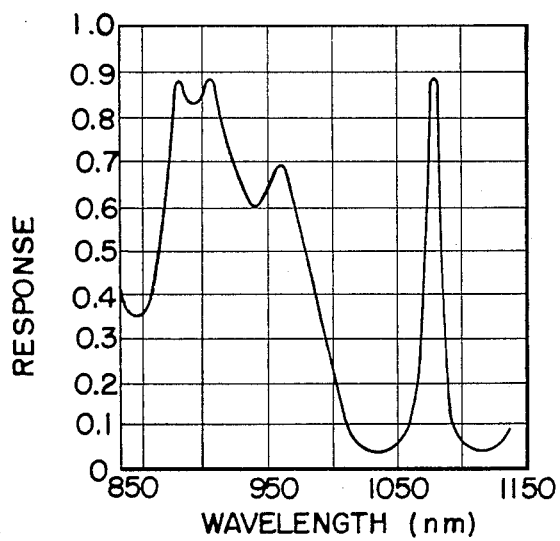
FIG. 2 is a graph which shows the radiation transmission passbands of a device constructed in accordance with the method and apparatus of the invention, the device not including out-of-band blocking layers.

The graph of FIG. 2 shows the spectral response of a spectrometer, constructed in accordance with the method and apparatus of the invention, for a range of incident wavelengths of between approximately 850 to 1100 nm. The graph of FIG. 2 can be seen to show well defined transmission passbands. It should be noted that the graph of FIG. 2 is illustrative of data obtained from a spectral disperser not having the out-of-band blocking stacks 24–28 deposited thereon.

Figure 3:
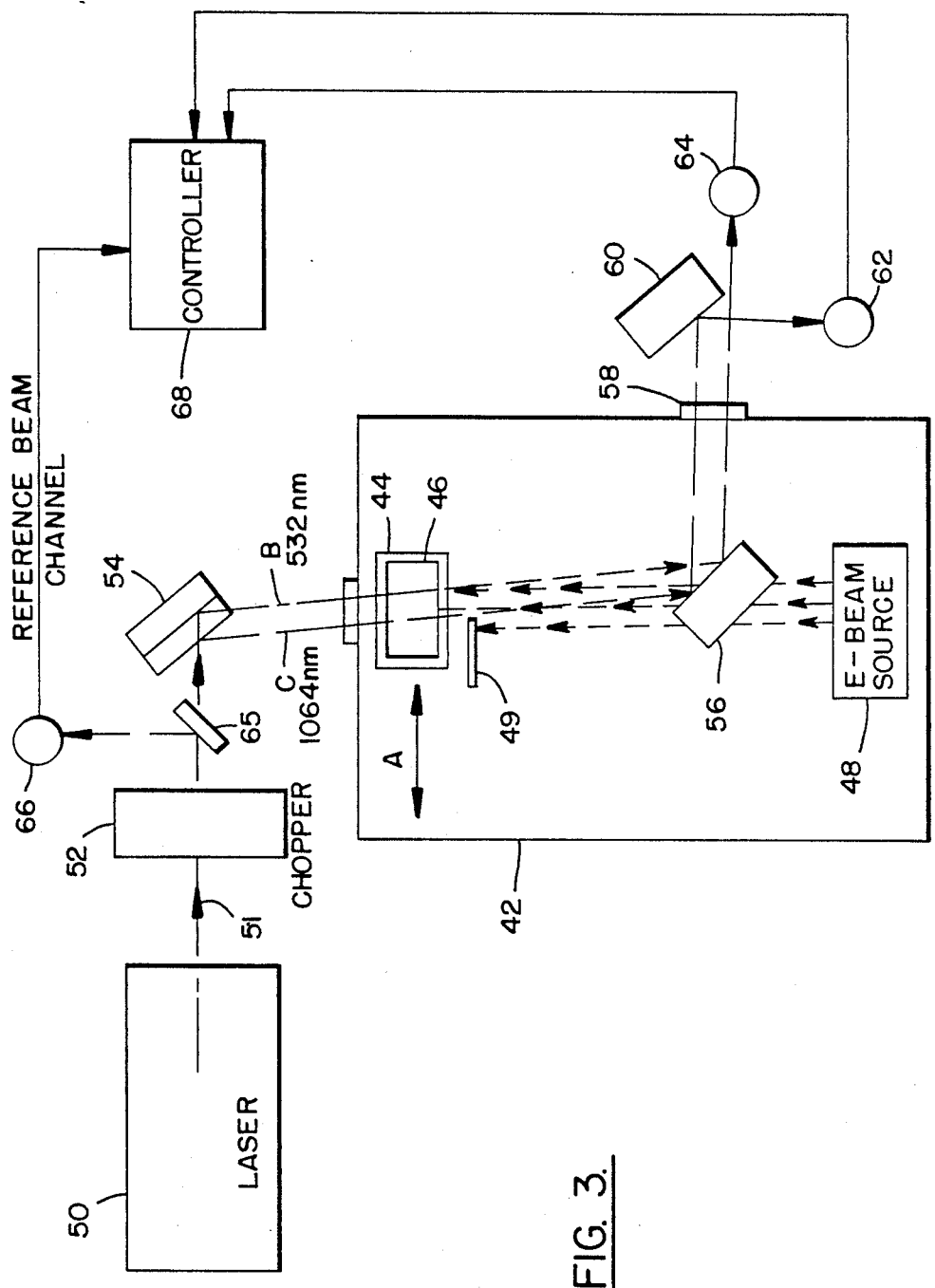
FIG. 3 is a block diagram of linear wedge-filter fabrication apparatus suitable for accomplishing a method of the invention.
Figure 4:
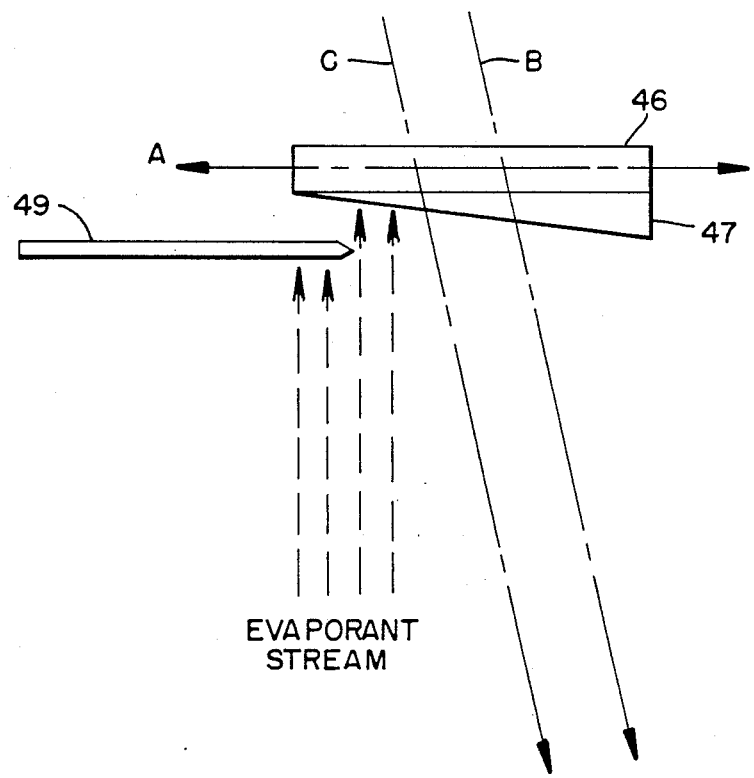
FIG. 4 shows in more detail a portion of the apparatus of FIG. 3.

Referring now to FIGS. 3 and 4 there is shown apparatus operable for realizing a method of the invention of producing the tapered layers 12 having a constant slope. In general, in order to deposit the layers 12 such that each has a thickness which varies in a constant manner from the first edge 13 of the substrate 14 to the opposing edge 15 the substrate 14 is driven at a substantially constant speed as it is exposed from behind a knife-edge aperture, in a oscillatory manner, to an evaporant stream of either H or L material. The knife-edge aperture placed adjacent to the substrate 14 produces a sharply defined evaporant stream deposition front. The substrate is held on a precision translation stage which is driven by a constant speed motor having a position encoder and a feedback control. The operation of the motor exposes the substrate to the evaporant stream. The position encoder tracks the linear displacement of the stage to a precision of approximately 2 microns. The thickness of a growing layer is monitored in a real time manner at two positions along the wedge dimension with two different wavelengths from a laser source. For example, a Nd:YAG continuous duty laser having a frequency doubling crystal is located outside of a vacuum chamber wherein the layers are deposited. A dichroic beam splitter physically separates the two wavelengths from the doubling crystal and directs each of the wavelengths to the vacuum chamber where they pass through the substrate 14 at precisely known distances from a reference edge, such as the edge 13, of the substrate.

Such an optical method of monitoring the growth of the layer accomplishes at least three valuable features simultaneously. Firstly, the quarter wave thicknesses of the layers are continuously and accurately monitored such that the stopping point of layer growth for each layer is precisely determined. Secondly, inasmuch as the locations of the passband centers for the two laser wavelengths are fixed, an automatic self-calibration of wavelength versus distance along the wedge direction is accomplished. Thirdly, the linearity of the layer slope is measured by the two known wavelengths transitting the tapered wedge coating at precisely known points along the wedge direction.

As can be seen in FIGS. 3 and 4, a tapered layer deposition system 40 as generally described above is comprised of a vacuum deposition chamber 42 wherein a substrate mount 44 has a substrate 46 affixed thereon. Substrate 46 is the transparent substrate upon which the layers are to be deposited, such as the substrate 14 of FIG. 1. As previously stated the substrate 46 may comprise, for example, a radiation detecting array or a vidicon faceplate. Not shown in FIG. 3 is a vacuum generation means for evacuating the chamber 42. Also not shown is the constant speed motor, position encoder and feedback control which drive the substrate mount 44 in a linear oscillatory manner as shown by the arrow A. An electron beam source 48 is positioned within the chamber 42 for directing an evaporated stream of H or L material which is to be deposited on the substrate 46. The knife-edge aperture 49 provides for the sharply defined deposition front. For example, the L layers may be comprised of silicon dioxide. The H layers may be comprised of titanium dioxide. These materials have been found to be suitable for use with wavelengths corresponding to visible radiation. A frequency doubled Nd:YAG laser 50 has an output beam 51 of wavelengths of 532 nm and 1064 nm, the output beam 51 being directed through a chopper 52 to a dichroic beam splitter 54 which is operable for separating the two wavelengths of the beam 51. The separated wavelengths form two distinct beams which travel substantially parallel one to another as shown by the beams B and C. The two beams B and C are directed such that they pass through the transparent substrate 46 at precisely determined points from a reference point and are thereafter reflected by a mirror 56 out of the chamber 42. Positioned adjacent to a window 58 may be a reflector 60 for reflecting the ray C to a first detector 62. The ray B is incident upon a second detector 64.

In accordance with the method of the invention, the beams from the YAG laser 50, having two precisely known wavelengths, are directed through the transparent substrate upon which the layers are being deposited. Each of the beams is thereby modified in intensity in accordance with the thickness of the layer. The intensity of each of the beams is detected by a separate detector, such as by a photodiode coupled to an amplifier. The output of the amplifier is indicative of the beam intensity and is thus also indicative of the layer thickness at the point where the beam intersects the layer. Also shown in FIG. 3 is a reference detector channel 66 which monitors the output of the laser 50 and which is used to normalize the beams B and C which are detected by detectors 62 and 64. Thus, any intensity fluctuations which may be present in the output of the laser are not interpreted as changes in deposited layer thickness.

A controller 68 may be provided for receiving the outputs of the reference channel 66 and the detectors 62 and 64 for determining the thickness and slope of the layers. Controller 68 may include a data processing means, such as a microcomputer operable for reading the intensity values and calculating the layer thickness and slope from the intensity values. Controller 68 may also be operable for controlling the E-beam source to switch between L and H evaporant material at appropriate times.

The method advantageously provides for a continuous determination of the layer thickness at two points along the desired taper direction, thereby enabling the E-beam source to be alternatively switched between H and L material when a layer is deposited to a desired quarter wave thickness. Also, the linearity of the slope of the layer may be simultaneous determined inasmuch as the measured beam intensities will differ one from the other by an amount related to the difference in thickness of the layer along the taper direction.

It should be realized that the method and apparatus of the invention disclosed above is illustrative only, and that based on the foregoing teaching, modifications thereto may occur to those having skill in the art. Thus, the method and apparatus of the invention is not to be limited by the embodiments disclosed herein, the invention is instead meant to be limited only as defined by the scope of the appended claims.

What is claimed is:

1. A wedge-filter spectrometer comprising:
means for spectrally dispersing an incident radiation beam, said dispersing means comprising a first plurality of layers of high (H) index of refraction material and a second plurality of layers of low (L) index of refraction material, individual ones of said H and said L layers overlying one another in a given sequence

H LL HLHLHL HH LHLHLH LL HL each of said H and said L layers having a substantially linearly tapered thickness of substantially constant slope, said layers HH being a spacer layer having a predetermined thickness for defining a passband, the thickness being substantially equal to a length associated with a number of whole wavelengths that evenly fit within the thickness of said spacer layer; and means, optically coupled to said dispersing means, for detecting at a plurality of points within a two-dimensional area a spectrally dispersed radiation beam, the radiation beam being spectrally dispersed by said H and said L layers.

2. A spectrometer as defined in claim 1 wherein said layers isolate a radiation transmission passband having a wavelength ($\lambda$) given by $$\lambda = 4nt$$

wherein n is the value of either the H or the L refractive index of the layers, and
wherein t is the total thickness of the layer of corresponding refractive index at a given point along said dispersing means from a reference point.

3. A wedge-filter spectrometer comprising:
means for spectrally dispersing an incident radiation beam, said dispersing means comprising a first plurality of layers of high (H) index of refraction material and a second plurality of layers of low (L) index of refraction material, individual ones of said H and said L layers overlying one another in a given sequence, each of said H and said L layers having a substantially linearly tapered thickness of substantially constant slope;
means, optically coupled to said dispersing means, for detecting at a plurality of points within a two-dimensional area a spectrally dispersed radiation beam, the radiation beam being spectrally dispersed by said H and said L layers; and
at least one interference blocking stack interposed between said incident radiation beam and an upper one of said layers.

4. A spectrometer as defined in claim 3 wherein said detecting means comprises a two dimensional array of photodiodes disposed to detect said dispersed radiation beam at a plurality of points.

5. A spectrometer as defined in claim 3 wherein said dispersing means is integrally formed upon a radiation receiving surface of said detecting means.

6. A wedge-filter spectrometer comprising:
a substrate comprised of a material which is substantially transparent to a cone of radiation incident upon a first surface of said substrate,
a plurality of linearly tapered interference layers disposed upon a second opposite surface of said substrate, said layers being disposed one upon another in a stacked fashion, each of said layers having a widest thickness along a first edge of said substrate and a narrowest thickness disposed along a second, opposite edge of said substrate, certain ones of said plurality of layers being comprised of a material having a high (H) index of refraction and certain ones of said plurality of layers being comprised of a material having a low (L) index of refraction, said H and L layers being arranged one upon another in accordance with a predetermined sequence for spectrally dispersing the incident radiation;
a two dimensional array of radiation detectors being disposed substantially parallel to said first surface of said substrate and underlying said plurality of layers, said array being responsive to said spectrally dispersed radiation at a plurality of points therein; and
means for maintaining said array of detectors in a parallel orientation with said upper surface.

7. A spectrometer as defined in claim 6 wherein said predetermined sequence defines a resonant cavity structure for producing a wavelength passband centered at a wavelength of $\lambda_c$ where
$\lambda_c$ is the passband center wavelength, and
$\lambda_0$ is a reference wavelength given by $$\lambda_0 = 4n_H t_H = 4n_L t_L$$
wherein
$n_H$ is the index of refraction of said H material,
$t_H$ is the thickness of said H material,
$n_L$ is the index of refraction of said L material, and
$t_L$ is the thickness of said L material.

8. A spectrometer as defined in claim 7 wherein said predetermined format is defined by layers

H LL HLHLHL HH LHLHLH LL HL and wherein the layers HH define a spacer layer the thickness of which is determinative of a width of said passband in accordance with the number of wavelengths $\lambda_c$ that evenly fit within the thickness of said spacer layer.

9. A spectrometer as defined in claim 3 wherein said plurality of interference layers comprise a plurality of said resonant cavity structures disposed one upon another for decreasing the width of said passband.

10. A spectrometer as defined in claim 9 wherein said spectrometer is responsive to radiation within a range of wavelengths of approximately 400 nm to 1000 nm and wherein said spectrometer further comprises a plurality of interference blocking stacks disposed upon said first surface of said substrate, each of said stacks being responsive to a given range of wavelengths for rejecting said given range of wavelengths.

11. A spectrometer as defined in claim 10 wherein said plurality of interference blocking stacks comprise three interference blocking stacks disposed adjacent one another upon said first surface, said stacks being disposed from said first edge to said second edge.

12. A spectrometer as defined in claim 11 wherein
a first one of said stacks is comprised of a plurality of substantially constant thickness layers of H and L material given by
$[LH]^6 1.3[LH]^6$, where L and H are quarter waves at approximately $\lambda = 520$ nm;
a second one of said stacks is comprised of linearly tapered layers of H and L material given by
$[LH]^7 2 [LH]^7$, where L and H are quarter waves at approximately $\lambda = 420$ nm; and
a third one of said stacks is comprised of substantially constant thickness layers of H and L material given by
$[LH]^6 1.6 [LH]^6$, where L and H are quarter waves at approximately $\lambda = 250$ nm.

13. A spectrometer as defined in claim 6 where said substrate is comprised of optical glass and wherein said L material is comprised of silicon dioxide and wherein said H material is comprised of titanium dioxide.

14. A spectrometer as defined in claim 6 wherein said maintaining means is a tapered layer of optical cement.

15. A spectrometer as defined in claim 12 wherein said cone of radiation is incident upon said first surface at an angle of between approximately 10° to 20° from a normal to said said first surface.

16. A spectrometer as defined in claim 6 wherein said spectrometer is responsive to radiation within a range of wavelengths of approximately 400 nm to 1000 nm and wherein said spectrometer further comprises a plurality of interference blocking stacks disposed upon said first surface of said substrate, each of said stacks being responsive to a given range of wavelengths.

17. A spectrometer as defined in claim 16 wherein said plurality of interference blocking stacks comprise three interference blocking stacks disposed adjacent one another upon said first surface, said stacks being disposed from said first edge to said second edge.

18. A wedge-filter spectrometer comprising:
means for spectrally dispersing radiation incident upon a first surface of said dispersing means, said dispersing means comprising a first plurality of layers of high (H) index of refraction material and a second plurality of layers of low (L) index of refraction material, individual ones of said H and said L layers overlying one another in a predetermined sequence, each of said H and said L layers having a substantially linearly tapered thickness of substantially constant slope, the predetermined sequence including a sequence having a plurality of centrally disposed layers having the same index of refraction, a plurality of pairs of layers comprised of a layer of high index of refraction material, a first one of the plurality of pairs of layers being disposed adjacent to a top surface of said centrally disposed layers, a second one of the plurality of pairs of layers being disposed adjacent to a bottom surface of said centrally disposed layers, and a pair of layers each having the same index of refraction disposed adjacent to each of the plurality of pair of layers; and means, optically coupled to said dispersing means at a second surface opposite the first surface, for detecting with a two-dimensional array of radiation sensors the spectrally dispersed radiation.

19. A wedge-filter spectrometer as defined in claim 18 wherein said detecting means is selected from a group consisting of a solid-state two-dimensional detector array, a vidicon, a photomultiplier with microchannel plates and a CCD imaging device.

20. A wedge-filter spectrometer as defined in claim 18 wherein said dispersing means is disposed upon a radiation receiving surface of said detecting means.

21. A wedge-filter spectrometer comprising:
means for spectrally dispersing radiation incident upon a first surface of said dispersing means, said dispersing means comprising a first plurality of layers of high (H) index of refraction material and a second plurality of layers of low (L) index of refraction material, individual ones of said H and said L layers overlying one another in a predetermined sequence, each of said H and said L layers having a substantially linearly tapered thickness of substantially constant slope;
means, optically coupled to said dispersing means at a second surface opposite the first surface, for detecting with a two-dimensional array of radiation sensors the spectrally dispersed radiation; and
at least one interference blocking stack interposed between said first surface of said dispersing means and the radiation.

* * * * *